United States Patent Office 2,767,811
Patented Oct. 23, 1956

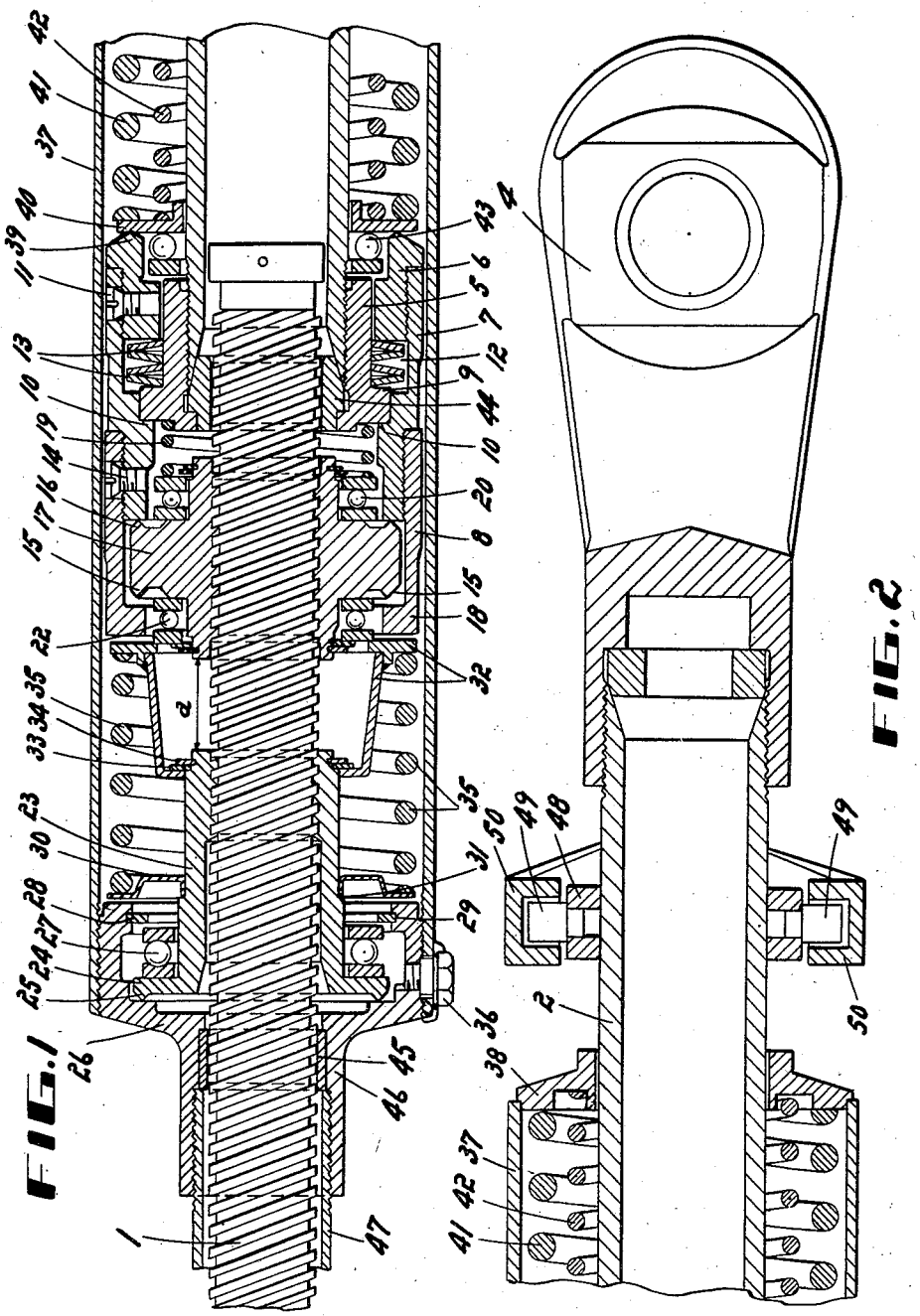

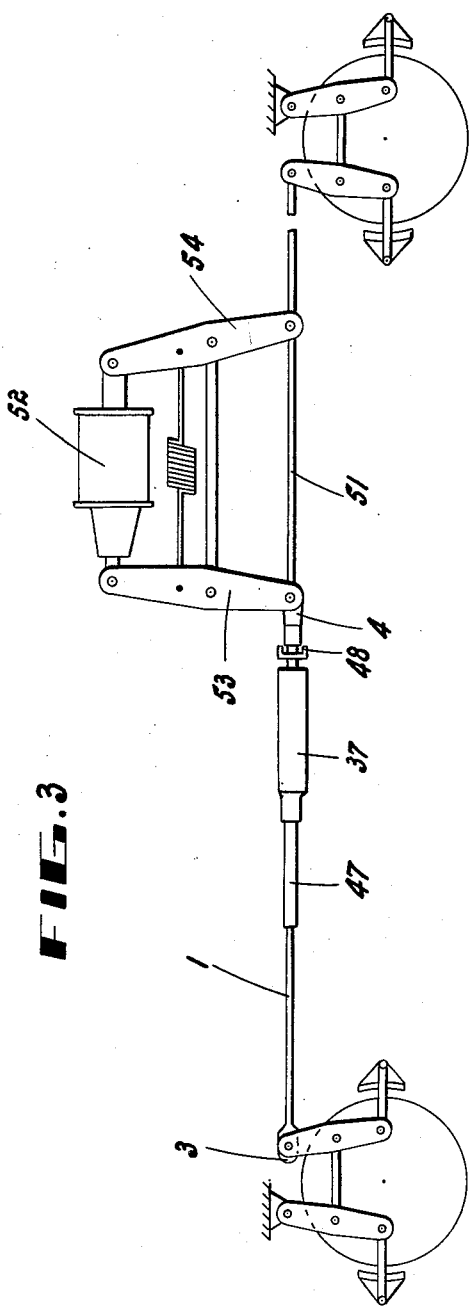

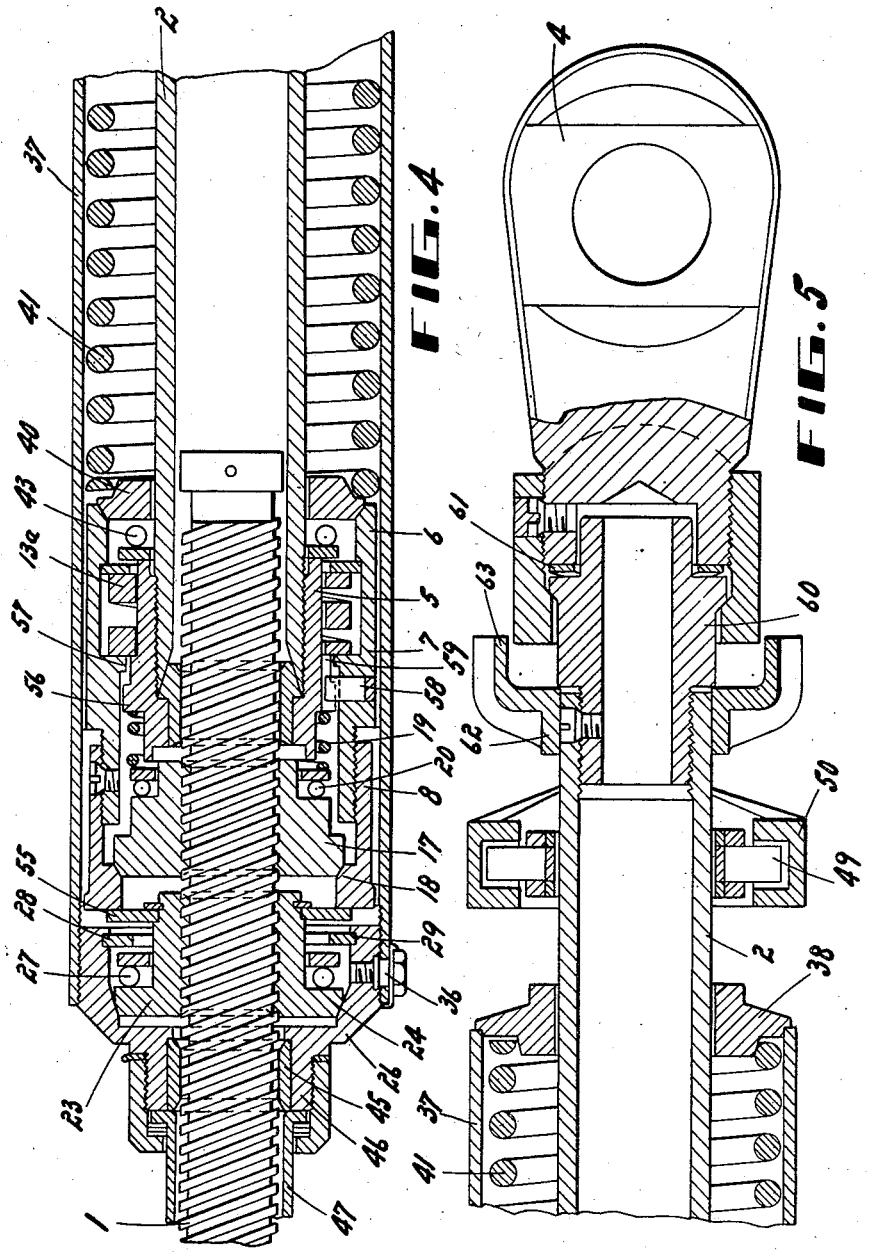

2,767,811

AUTOMATIC SLACK ADJUSTER

Bert Henry Browall and Erik Mauritz Jeppsson, Malmo, Sweden, assignors to Svenska Aktiebolaget Bromsregulator, Malmo, Sweden, a corporation of Sweden Application December 4, 1951, Serial No. 259,864

Claims priority, application Sweden February 27, 1951

7 Claims. (Cl. 188—196)

This invention relates to automatic slack adjusters for vehicle brakes, particularly railway vehicle brakes, of the kind comprising a brake rod which is divided into two parts which are relatively axially displaceable, and two nuts of which one, called the coupling member, acts between the two parts of the rod for coupling them to each other for transmitting the braking power on braking, whereas the other nut, called the adjusting member, acts between one part of the rod and an actuating member which is axially displaceable on the other part of the rod by a control device acting in dependence on the movement of the brake on braking, the actuating member being subject to the action of a spring or springs which tend to displace the actuating member in the direction in which the said one rod part is to be displaced in relation to the said other rod part to reduce the slack of the brake.

An automatic brake slack adjuster of this kind, whether it be single-acting or double-acting, that is to say, only for reducing the slack when this has become too great or both for reducing and also for increasing the slack when this has become too great or too small, is primarily characterised, in accordance with the invention, by a locking mechanism which normally holds the actuating member against movement relatively to the said one rod part in the slack reducing direction, and which is released by the action of the stress arising in the brake rod on braking and, when released, allows the actuating member to be displaced on the brake rod in the slack reducing direction.

By means of the above-mentioned locking mechanism the spring force which actuates the actuating member in the slack reducing direction may be considerably weaker than is feasible in the automatic brake slack adjusters of the usual construction if they are to operate in an entirely reliable manner. This can briefly be explained as follows.

The movement carried out by the brake on braking is composed partly of the application movement for consuming the slack of the brake and partly of the resilient yielding of the brake gear to the braking stress arising after the brake shoes have been applied. Since the resilient yielding of the brake gear varies with the varying braking stress and also can be very different in different brake gears, it is desirable, if a reliable and regularly operating slack adjuster is to be obtained, that only the initial brake application movement corresponding to the slack of the brake should determine the actuation of the slack adjuster, so that the degree to which the brake gear yields on braking does not influence the brake shoe clearances as adjusted by the slack adjuster when the brake is released. For this purpose in the slack adjusters of the kind herein concerned, the aforesaid adjusting member is also displaceable on one rod part in the slack reducing direction, but in such a manner that for the displacement in this direction a force determined by a slip friction clutch or frictional resistance of another kind is necessary. The maximum value of the force thus determined that can be transmitted by the adjusting member to the said one rod part in the direction to reduce the slack must be sufficient to displace the rod parts relatively to one another for effecting an adjustment when, on releasing the brake, the braking stress between them disappears. If the slack adjuster is double-acting the displacing force has to carry out a further task, namely to overcome the idle resistance of the brake gear when starting to brake. The displacing force, however, must itself be overcome with sufficient certainty by the spring force which actuates the actuating member in the slack reducing direction, and this spring force must therefore be fairly large. This, however, is a disadvantage because this spring force has to be overcome on braking by the braking force and counteracts the latter. If the locking mechanism of the invention is used, there is no longer any need for a slipping movement of the adjusting member, in the direction to reduce the slack, on the part of the rod with which it coacts and consequently there is also no need for that enlargement of the spring force on the actuating member which was required for overcoming with sufficient certainty the frictional resistance against the aforesaid slipping movement of the adjusting member. The result is that the spring force on the actuating member and consequently the resistance offered by the slack adjuster against the braking force may be made considerably less than hitherto usual.

Double-acting slack adjusters of the aforesaid kind differ from single-acting slack adjusters in that the coupling of the two rod parts together during the brake application movement of the brake is delayed until the coupling member is set in action by the actuating member at a predetermined point in the brake application movement and only then permits the transmission of the braking force. In the constructions which are now conventional the double-acting slack adjusters suffer from the disadvantage that, on an application of the brake, the braking action may not take place or is dangerously weakened due to a malfunction of the slack adjuster caused by an extraordinarily great resistance to the movement of the brake gear occuring on starting to brake, for example, owing to an accumulation of snow or ice in the clearances between the brake shoes and the wheels of the vehicle. Such an extraordinarily great resistance may cause an unintended displacement of the parts of the brake rod relative to one another in the direction to increase the clearances before the actuating member affords the coupling member the opportunity of coupling the rod parts together in this direction. By means of the locking mechanism of the invention the above mentioned disadvantage of double-acting slack adjusters can be reduced in a simple and reliable manner as will hereafter be described in greater detail.

Further characteristic features and advantages of the invention will be clear from the following description of examples of slack adjusters in accordance with the invention which are illustrated in the accompanying drawings, in which:

Figures 1 and 2 show a double-acting slack adjuster, each figure being an axial section through one half.

Figure 3 is a diagrammatic view showng the attachment of the slack adjuster in a conventional brake rigging, and Figures 4 and 5 are views similar to Figures 1 and 2 showing a single-acting slack adjuster.

In the two examples which have been selected for illustrating the invention, the automatic slack adjuster is of the type in which the two nuts are mounted on one part of the two-part brake rod, which rod part is in the form of a threaded spindle having a reversible pitch (that is to say, such a pitch as to be non-self-locking), because this type is not only particularly advantageous but also enables the present invention to be readily applied. The invention can, however, also be used with other types of automatic slack adjusters of the kind which has been previously mentioned.

Referring to Figures 1–3, of the drawings, in the brake gear or rigging is included a pull rod which comprises two parts which are axially displaceable relative to one another, namely a threaded spindle 1 with reversible pitch, and a tubular rod 2 into which the spindle 1 can enter. The parts 1 and 2 are provided with connection eyes 3 and 4 respectively at their opposite ends for enabling the pull rod to be connected in the brake gear for transmitting the braking power from one brake lever to another. On the end of the tubular rod 2 remote from the eye 4 is screwed a connecting sleeve composed of four parts 5, 6, 7, 8. The inner part 5 of this casing is in the form of a sleeve which is screwed directly on to the tubular rod 2 and is provided with a bearing shoulder 9 over which the outermost casing part, namely the connecting sleeve 7 is axially displaceable. The axial displacement, however, in the direction towards the eye 4, is limited by means of a shoulder 10 which coacts with the bearing shoulder 9. The middle part of the casing, namely the connecting ring 6, which is screwed into the connecting sleeve 7, and is locked to this by means of a screw 11, is mounted so as to be axially displaceable on the cylindrical part of the sleeve 5. The axial length of the connecting ring 6 is such that an annular space 12 remains between the inner end of the connecting ring 6 and the bearing shoulder 9. In this space is interposed a stiff cushioning spring which is composed of a number of Belleville discs 13 and which transmits the braking power from the sleeve 5 mounted on the tube 2 to the connecting sleeve 7 which is displaceable within predetermined limits relative to the sleeve 5.

On the end of the connecting sleeve 7 remote from the eye 4 is screwed the part 8 which is in the form of a sleeve having an inturned flange 18, the parts 7 and 8 being locked together by means of a screw 14. In the space between the inturned flange 18 of the sleeve 8 and the end of the connecting sleeve 7 facing the flange, is disposed a radially extended part of a nut 17 which is mounted on the threaded spindle and represents the coupling nut hereinbefore referred to as the coupling member. This radially extended part is formed with suitable surfaces or edges 15, 16 for frictional engagement with the abutment surfaces on the flange 18 and the connecting sleeve 7. The nut 17 serves to couple the rod parts 1 and 2 together on braking in order to enable the braking power to be transmitted. Between this coupling nut 17 and the tubular rod 2, or the part 5 fixed on the latter, is a relatively weak compression spring 19 which acts on the nut through the agency of an axial ball-bearing 20. When this spring 19 alone acts on the coupling nut 17, it holds the nut with the friction edge 15 against the flange 18 on the sleeve 8.

When the coupling nut 17 is in this position it couples the two parts 1 and 2 of the brake rod together against relative displacement in the direction to increase the slack of the brake, whereas the nut 17 locks the two parts 1 and 2 against relative displacement in the other direction, that is to say, in the direction to reduce the slack of the brake, when its edge 16 bears against the connecting sleeve 7.

On the threaded spindle there is mounted another nut 23 which represents the adjusting nut which hereinbefore has been referred to as the adjusting member. This has on its end remote from the coupling nut 17 a flange-like extension 24 having a suitable surface or edge 25 for frictional engagement with an abutment surface on a sleeve 26. On the opposite side of the flange 24 is mounted an axial ball bearing 27 and behind this a stop ring 28 is set into a groove 29 in the sleeve 26. The distance between the ring 28 and the surface of the sleeve 26 which coacts with the edge 25 is great enough so that the flange 24 and the ball bearing 27 are able to make a certain amount of axial movement between these stops.

A supporting ring 30 bears against a shoulder 31 on the adjusting nut 23, on which there is also displaceably mounted a sleeve 32 which projects forwardly towards the coupling nut 17. The sleeve 32 coacts with a stop ring 33 which is fitted on the nut 23 and is held fast by a locking ring 34. A compression spring 35 is interposed between the ring 30 and the sleeve 32, this spring 35 being stronger than the spring 19. The spring 35 together with the sleeve 32 which is normally pressed by the spring 35 against the stop ring 33 forms a resilient cushion acting between the two nuts 23 and 17 by the intermediary of an axial ball bearing 22 arranged on the coupling nut 17.

The sleeve 26 is screwed in a tubular operating member 37 and is secured in place by means of a screw 36. The end of the operating member 37 adjacent the eye 4 is closed by an end wall 38 which is rotatable and axially displaceable on the rod part 2. Two concentric pre-compressed coiled compression springs 41 and 42 are inserted between the end wall 38 and a bearing ring 40, which is displaceable on the rod part 2 and coacts with a friction edge 39 on the locking ring 6. The springs 41 and 42 tend to displace the end wall 38, the member 37 and the sleeve 26 which coacts with the adjusting nut 23 in relation to the rod part 2 in the direction which reduces the slack of the brake. In the intermediate space between the abutment 40 and the end of the sleeve 5 adjacent the eye 4 is interposed an axial ball bearing 43, which, in the position shown in the drawing, in which the shoulder 10 bears against the bearing shoulder 9, has a certain amount of axial movability in the said intermediate space.

A guide ring 44 for the spindle 1 is clamped between the rod part 2 and the sleeve 5 when these two parts are screwed together. Another guide ring 45 is disposed in the neck-like part 46 of the sleeve 26, where it is fixed by a protecting tube 47 which is screwed into the neck 46. The tube 47 extends over the threaded part of the spindle 1 and keeps it from becoming dirty.

A control device comprising a stop ring 48 for controlling the slack adjusting operation of the slack adjuster is mounted so as to be easily slidable on the rod part 2. The ring 48 is provided with two radially projecting pins 49. On these pins is hooked a fork 50 which is rigidly connected with a control rod 51 (Figure 3), which is interposed in the brake gear in such a manner that, on braking, the ring 48 and the rod part 2 are relatively displaced proportionally to the stroke of the brake piston. When, as shown in Figure 3, the push rod of the brake cylinder 52 acts on two brake levers 53 and 54 which are connected together in the usual manner and the slack adjuster is coupled to the end of the lever 53 remote from the cylinder, the control rod 51 is preferably coupled to the corresponding end of the other lever 54.

The operation of the slack adjuster which has been described is as follows:

With normal brake clearances, when the brake is released, the adjusting nut 23 is locked in its normal rest position at a distance $d$ from the coupling nut 17 in which the sleeve 32 bearing against the stop 33 extends to the ball bearing 22 on the coupling nut 17 and presses this sufficiently far in the direction towards the eye 4, in opposition to the spring 19, that the edge 16 of the coupling nut 17 is pressed against the sleeve 7. The force of the springs 41, 42, then acts through the end wall 38, the operating member 37 and the sleeve 26 on the adjusting nut 23 which therefore tends to push the threaded spindle 1 further into the rod part 2. No such movement can take place, however, because the necessary rotation of the coupling nut 17 about the spindle 1 is prevented because of the nut bearing against the sleeve 7. This bearing of the nut 17 against the sleeve 7 is thus subject to the whole force of the springs 41 and 42, except for a small reduction due to the counterforce of the spring 19.

If the brake shoe clearances are correct, that is to say, of the size which corresponds to the adjusted distance between the ring 48 and the end wall 38 when the brake is released, the operation on braking and following release of the brake takes place as follows:

On braking, the eye 4 connected to the brake lever 53 is moved to the right in the drawing, whereby in the first place the entire slack adjuster moves longitudinally with the brake rod. Consequently, the distance between the end wall 38 and the stop ring 48 is reduced. If, during this initial movement, the resistance becomes so great that the stress in the brake rod 1, 2 reaches or exceeds the force of the springs 41 and 42, the result is that the spindle 1 and consequently the adjusting nut 23 and the coupling nut 17 are retarded for a moment whereby the sleeve 7 is withdrawn from its abutment against the edge 16 of the coupling nut 17, and instead the flange 18 of the sleeve 8 abuts against the edge 15. The coupling nut 17 and spindle 1 are thus forced to take part in the continued movement of the rod part 2 towards the right. The actual braking stress occurs, if the brake shoe clearances are correct, at the moment when the ring 48 and the end wall 38 bear against one another. This braking stress is transmitted by the rod part 2, through the sleeve 5, the bearing shoulder 9, the Belleville discs 13, the connecting ring 6, the connecting sleeve 7, the sleeve 8 and the coupling nut 17 to the threaded spindle 1. Under the action of the braking stress the Belleville discs 13 are flattened, whereby the ball bearing 43 displaces the abutment 40 from its support against friction edge 39 and out of frictional engagement with the locking ring 6 and thereby releases the locking mechanism consisting of the two members 6 and 40 from its locking position. Until thus released the locking mechanism 6, 40, through the intermediary of the springs 41, 42 and the outer casing parts 38, 37, 26, has prevented the adjusting nut 23 from rotating on the spindle 1 under the action of the springs 41, 42, and also after the release of the locking mechanism no such rotation of the adjusting nut 23 can take place in this case, due to the abutment of the ring 48 against the end wall 38 of the operating member 37.

On the continued movement of the eye 4 towards the right due to the elastic deflection of the brake gear under the rising braking stress, the ring 48 thus prevents the outer casing 38, 37, 26 from taking part in this movement. On the other hand the threaded spindle 1 takes part in the movement towards the right and carries the adjusting nut 23 with it, so that the friction surface 25 no longer engages the sleeve 26 but, instead of this, the ball bearing 27 bears against the stop ring 28. On the further movement of the spindle 1 towards the right, therefore, the adjusting nut 23 bears against the ball bearing 27 and rotates on the spindle 1. The support 30, the spring 35 and the sleeve 32, of course, also take part in this rotation, whereby the sleeve 32 ceases to make contact with the ball bearing 22 which moves to the right together with the coupling nut 17.

When the brake is again released and the eye 4 and the parts connected to it as well as the spindle 1 begin to move to the left, though still being subject to stress, the spindle 1 carries the adjusting nut 23 with it and causes it to bear against the sleeve 26. On the continued movement of the spindle to the left, however, the sleeve 26, the operating member 37 and the end wall 38 are not carried with it, because the pressure of the nut 23 against the sleeve 26 leads both to a reduction of the bearing pressure between the end wall 38 and the stop ring 48 and to a torque between the spindle 1 and the nut 23. As the support 40 is held out of engagement with the friction edge 39 by the ball bearing 43, the entire outer casing 26, 37, 38, which constitutes the operating member, as well as the springs 41, 42 and the support 40 rotate on the ball bearing 43 together with the nut 23 as the spindle 1 returns further towards the left, so that the end wall 38 maintains contact with the ring 48 during the whole of this time. This movement is continued as long as the stress in the brake rod is still sufficient to hold the Belleville discs 13 pressed flat. At the moment when the brake stress falls below this value the Belleville discs 13 again expand and the support 40 bears against the friction edge 39, so that the operating member 26, 37, 38 is clutched to the rod part 2 and thus locked against further rotation and the nut 23 can no longer rotate on the spindle 1. If, as has been assumed, the brake shoe clearances were correct, at this moment the bearing 22 has also reached the sleeve 32, so that the nut 17 is also arrested and the sleeve 7 again comes into bearing contact against the friction edge 16. From this moment onwards the entire slack adjuster moves longitudinally to the left with the brake rod until the end of the releasing movement, at the end of which the distance between the end wall 38 and the ring 48 is also restored to its original value. No adjustment has taken place and the distance $d$ between the nuts 17 and 23 is restored to the same value which it had previously with normal clearances and released brake.

If, on the other hand, the brake shoe clearances are too large, no braking stress has been created when, during the brake application movement, the end wall 38 meets the ring 48. The spindle 1 is then, as previously, momentarily arrested until the flange 18 of the sleeve 8 bears against the friction edge 15 on the nut 17. Thereupon the spindle 1 is forcefully drawn towards the right and at first carries the nut 23 with it until the ball bearing 27 bears against the stop ring 28 and is then carried further through the nut 23 which is being held by the ball bearing 27 and rotates on the spindle 1. After a movement corresponding to the excess of the brake shoe clearances, braking stress occurs, the Belleville discs 13 are compressed, the locking mechanism 6, 40 is released, and the braking movement is completed in the same manner as previously described for normal clearances, but with the sole difference that the augmentation of the distance between nuts 17 and 23 is greater than in the previous case. On the release of the brake, the nut 23 and the operating member 26, 37, 38 again rotate on the ball bearing 43 on the movement of the spindle 1 towards the left so long as braking stress is still present and holds the locking mechanism 6, 40 released. When the braking stress ceases and the operating member 26, 37, 38, together with the nut 23 is locked against further rotation by reason of the support 40 bearing against the friction edge 39, the nut 17 with its ball bearing 22 has not yet again come into contact with the sleeve 32, and therefore on the continued movement of the eye 4 towards the left, the nut 17 is pushed by the spring 19 and the ball bearing 20 and rotates on the spindle 1 until the ball bearing 22 meets the sleeve 32. The displacement of the nut 17 then ceases and the sleeve 7 again comes to bear against the friction edge 16. The distance between the nuts 17 and 23 has then been brought again to its normal value $d$, on released brake. Up to this moment, the springs 41, 42 have held the end wall 38 pressed against the ring 48 but, on the abutment of the sleeve 7 against the edge 16, the whole slack adjuster moves longitudinally together with the brake rod during the remainder of the releasing movement, which proceeds in exactly the same way as the corresponding movement when the clearances are normal. The whole of the excess brake shoe clearances has therefore been compensated.

Finally, if the brake shoe clearances are too small, the spindle 1 is arrested, the flange 18 comes to bear against the friction edge 15, and braking stress begins to arise before the end wall 38 has been able to bear against the stop ring 48. When the Belleville discs 13 are compressed by the rising braking stress and the edge 39 is released from the support 40, the nut 23 and the operating member 26, 37, 38 are displaced towards the right by the springs 41 and 42 under rotation on the ball bearing 43, until the end wall 38 is arrested by the stop ring 48. Thereby the nut 23 is caused to enter the sleeve 32 bearing against the ball bearing 22 on the locking nut 17, under yielding of the spring 35, so that the distance between the nuts 17 and 23 is reduced in comparison with the value $d$ which exists with normal brake clearances on released brake. The movement corresponding to this reduction is stored in the spring 35 by the yielding thereof. The magnitude of the movement which is stored in the spring 35 is dependent on how much too small the brake clearances were. It is to be noted, however, that the conditions prevailing at the release of the brake are decisive of the amount of compression of the spring 35 remaining until the next braking, in that the final distance between the nuts 17 and 23 is determined by the piston travel at which, on releasing the brake, the braking stress disappeared and the friction edge 39 again came into engagement with the support 40.

On the next braking the spring cushion 32, 35 tends to hold the nut 17 with its edge 15 away from the flange 18 by returning the amount of movement, which during the release of the brake after the preceding braking was stored in the spring 35. When the eye 4 and the casing 5, 6, 7, 8 are drawn towards the right, therefore, the nut 17 rotates on the ball bearing 22 and is moved in the direction to increase the slack of the brake until the sleeve 32 is arrested by the stop ring 33, that is to say, until the above-defined distance $d$ is restored. Only after this has occurred can the sleeve 8 with its stop 18 abut against the friction edge 15 on the nut 17 and the braking force be developed. The brake rod 1, 2 is then extended by exactly the same amount as was found necessary on release after the preceding braking to obtain the normal brake clearances.

This method of operation affords good security against unintentional alterations in length of the slack adjuster in the direction to increase the brake clearances. If, for example, the resistance to movement during a brake application movement with normal brake clearances becomes so great for any reason that not only is the power of the springs 41, 42 overcome and the flange 18 of the sleeve 8 bears against the friction edge 15 on the nut 17, but the resilient rings 13 are also compressed and the locking mechanism 6, 40 is prematurely released so that the distance between the nuts 17 and 23 falls below the value $d$, then, after the end wall 38 bears against the stop ring 48, the nut 17 nevertheless moves further towards the right, the resistance to movement being overcome, so that the distance between the nuts 17 and 23 again becomes greater. Whether, on the next braking, an increase in the length of the slack adjuster is to occur does not depend on such a chance reduction in the distance between nuts 17 and 23 during the course of the brake application movement, but on the value to which this distance is adjusted on releasing the brake. During the release of the brake the said resistances to movement are no longer active and are thus not able to compress the resilient rings 13, and the adjustment of the distance between the locking nuts 17, 23 is then dependent on where in the stroke of the brake the actual braking stress ceases. This is an important advantage as compared with automatic double-acting slack adjusters of the hitherto conventional type according to which the amount of adjustment in the direction to increase the slack was determined by forces arising in the brake gear during the initial brake application movement and which were often incalculable.

In the single acting form of automatic slack adjuster illustrated in Figures 4 and 5 most of the details accord entirely or mainly with the corresponding parts which have already been described in connection with the double-acting slack adjusted illustrated in Figures 1 and 2 and have therefore been given the same reference numerals. For this reason it is unnecessary to give a complete description of all parts of the form of construction illustrated in Figures 4 and 5 and it will be sufficient to mention briefly in which way the construction according to Figures 4 and 5 differs from that of Figures 1 and 2. In the construction according to Figures 4 and 5 the adjusting nut 23 carries no spring cushion, and there is only one ball bearing for the nut 17 to coact with. Whereas in Figures 1 and 2 the power of the springs 41, 42 is transmitted by the operating member 38, 37, 26, the nut 23, the spindle 1, the coupling nut 17 and the sleeve 7 to the connecting member 6, in the construction according to Figures 4 and 5 the power of the spring 41 is also transmitted by the operating member 38, 37, 26 to the nut 23, but from nut 23 the power is directly transmitted by a ring 55 fixed to the nut 23, to the sleeve 8 and by this to the sleeve 7 which in this case is formed in one piece with the connecting ring 6. The Belleville discs 13 in Figure 1 are replaced in Figure 4 by a short strong coiled spring 13$a$. The sleeve 5 and the connecting sleeve 7 have a pair of stops 56, 57 respectively which coact in order to limit the compression of the spring 13$a$ under the action of the braking stress during braking. The coupling nut 17 coacts in this case only in one direction with a stop, namely with the flange 18 on the sleeve 8 for transmitting the braking force. In order to prevent rotation of the connecting sleeve 7 relatively to the rod part 2, this sleeve is provided with a pin 58 which engages in a groove 59 in the sleeve 5 mounted on the rod part 2. The rod part 2 is connected to the eye 4 by means of a part 60 which is rotatably mounted in the eye, and a tension disc 61 is inserted between this part and the eye. It is therefore possible to rotate the rod part 2 relative to the eye by hand, so that, if desired, an adjustment can be effected by hand, for example, on renewal of worn-out brake shoes. In order to facilitate manual rotation of the rod part 2, a ring 62 is fixed on it which is provided with a number of projections 63.

What we claim and desire to secure by Letters Patent is:

1. An automatic slack adjuster for brakes comprising a two-part brake rod, the parts of which are axially displaceable in relation to each other, an adjusting member and a coupling member mounted on the first part of said brake rod, a connecting member engaged with said coupling member and the second part of said brake rod for connecting them, means engaged with said adjusting member and adapted to be locked to said connecting member for holding said adjusting member against movement on said first part of said brake rod, said connecting member being normally in locking engagement with said means engaged with said adjusting member, and said connecting member being movable out of its said locking engagement by the action thereon of the braking stress which arises in said brake rod and is transmitted between said parts thereof by said connecting member and said coupling member on application of brakes operated by said brake rod.

2. An automatic slack adjuster for brakes comprising a two-part brake rod, the parts of which are axially displaceable in relation to each other, an adjusting member and a coupling member mounted on the first part of said brake rod, a connecting member engaged with said coupling member and the second part of said brake rod for connecting them, means engaged with said adjusting member and adapted to be locked to said connecting member for locking said adjusting member against displacement on said first part of said brake rod, and spring means disposed between said connecting member and said second part of said brake rod, partaking in the transmission between said two brake rod parts of the braking stress which arises in said brake rod on application of brakes operated by said brake rod, and urging said connecting member into locking engagement with said means engaged with said adjusting member and releasing said locking engagement by yielding to said braking stress when this reaches a predetermined value.

3. An automatic slack adjuster for brakes comprising a two-part brake rod, the first part of said brake rod being a threaded spindle having threads which are of such a pitch as to make them non-selflocking, the second part of said brake rod being a tubular rod, one end of said spindle positioned within one end of said tubular rod and axially displaceable therein, an adjusting member threadedly mounted on said spindle, a coupling member threadedly mounted on said spindle between said adjusting member and said tubular rod adjacent said one end thereof, a connecting sleeve engaged with said coupling member and axially movable within limits on said one end of said tubular rod, spring means positioned between said connecting sleeve and said tubular rod, urging said connecting sleeve on said tubular rod in a direction opposite to the direction in which said connecting sleeve will be urged on said tubular rod by the braking stress which arises in said brake rod and is transmitted between said tubular rod and said spindle by said connecting sleeve, spring means and coupling member on application of brakes operated by said brake rod, an operating member rotatable and axially movable on said tubular rod, enclosing said adjusting member and said coupling member, further spring means disposed between said operating member and said connecting sleeve, urging said operating member over said tubular rod in the same direction in which said connecting sleeve is urged on said tubular rod by said first spring means and normally maintaining engagement of said operating member with said adjusting member, and locking means disposed between said connecting sleeve and said operating member normally interlocking them to hold said operating member against rotation on said tubular rod and thereby said adjusting member against movement on said spindle and unlocking said operating member from said connecting sleeve on yielding of said first spring means to braking stress applied to said brake rod.

4. An automatic slack adjuster as claimed in claim 3, said locking means comprising a bearing ring slidably mounted on said tubular rod and positioned between said connecting sleeve and said further spring means, being biased for frictional engagement with said connecting sleeve and rotationally coupled to said operating member by said further spring means, a first bearing shoulder fixedly mounted on said tubular rod between said bearing ring and said one end of said tubular rod and retaining said first spring means in cooperation with said connecting sleeve, a second bearing shoulder fixedly mounted on said tubular rod between said first bearing shoulder and said bearing ring, and anti-friction means slidably interposed between said second bearing shoulder and said bearing ring, whereby when said first spring means yields to braking stress applied to said brake rod, said bearing ring is moved out of frictional engagement with said connecting sleeve by said second bearing shoulder and anti-friction means.

5. An automatic slack adjuster as claimed in claim 4 wherein said connecting sleeve has two frictional engaging portions adjacent said coupling member, one between said adjusting member and said coupling member, the other between said one end of said tubular rod and said coupling member, positioned to permit slight movement of said connecting sleeve relative to said coupling member, said coupling member having two frictional engaging portions disposed adjacent said frictional engaging portions of said connecting sleeve.

6. An automatic slack adjuster as claimed in claim 5, having spring means positioned between one end of said tubular rod and said coupling member, urging said coupling member towards said adjusting member, anti-friction means positioned between said coupling member spring means and said coupling member, a compressed spring cushion positioned between said adjusting member and said coupling member, determining an axial distance between said adjusting member and said coupling member and adapted to be further compressed between said adjusting member and said coupling member to permit them to move closer together than said distance, and anti-friction means disposed between said compressed spring cushion and said coupling member.

7. An automatic slack adjuster as claimed in claim 6, said compressed spring cushion comprising a spring support on said adjusting member, a sleeve surrounding said adjusting member and axially displaceable thereon, a spring inserted under stress between said spring support and said sleeve, and a stop on said adjusting member to limit the displacement of said sleeve on said adjusting member by said spring towards said coupling member.

References Cited in the file of this patent

UNITED STATES PATENTS

| | | |
|---|---|---|
| 2,225,001 | Browall | Dec. 17, 1940 |
| 2,497,343 | Carlbom | Feb. 14, 1950 |

FOREIGN PATENTS

| | | |
|---|---|---|
| 693,624 | France | Nov. 22, 1930 |